(12) United States Patent
Ishimitsu et al.

(10) Patent No.: US 10,146,175 B2
(45) Date of Patent: Dec. 4, 2018

(54) IMAGE FORMING APPARATUS

(71) Applicants: Hiroki Ishimitsu, Kanagawa (JP);
Katsuhiro Hoshi, Kanagawa (JP);
Takayuki Nishi, Kanagawa (JP);
Kazuyuki Ito, Kanagawa (JP);
Yoshihide Ohta, Kanagawa (JP);
Nobuhiro Shima, Kanagawa (JP)

(72) Inventors: Hiroki Ishimitsu, Kanagawa (JP);
Katsuhiro Hoshi, Kanagawa (JP);
Takayuki Nishi, Kanagawa (JP);
Kazuyuki Ito, Kanagawa (JP);
Yoshihide Ohta, Kanagawa (JP);
Nobuhiro Shima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/228,285

(22) Filed: Aug. 4, 2016

(65) Prior Publication Data
US 2017/0064109 A1  Mar. 2, 2017

(30) Foreign Application Priority Data

Aug. 28, 2015 (JP) ................................. 2015-169518

(51) Int. Cl.
*G03G 21/16* (2006.01)
*H04N 1/00* (2006.01)
*H04N 1/04* (2006.01)
*G03G 15/00* (2006.01)

(52) U.S. Cl.
CPC ......... *G03G 21/1652* (2013.01); *G03G 15/80* (2013.01); *G03G 21/1619* (2013.01); *H04N 1/00541* (2013.01); *H04N 1/04* (2013.01); *H04N 2201/0094* (2013.01)

(58) Field of Classification Search
None
See application file for complete search history.

(56) References Cited

U.S. PATENT DOCUMENTS 5,049,946 A * 9/1991 Harada ................ G03G 15/234
355/24
5,881,340 A 3/1999 Stickney et al.
6,366,747 B1 * 4/2002 Roller ................ G03G 15/5016
399/110

(Continued)

FOREIGN PATENT DOCUMENTS

JP  2003-146522  5/2003
JP  2006-349849  12/2006
JP  2012-185462  9/2012

OTHER PUBLICATIONS

Extended European Search Report dated Feb. 24, 2017 issued in corresponding European Application No. 16183847.9.

(Continued)

*Primary Examiner* — Thomas Giampaolo, II
(74) *Attorney, Agent, or Firm* — Harness, Dickey & Pierce, P.L.C.

(57) ABSTRACT

An image forming apparatus includes a scanner to read an image on an original and an electric box disposed below the scanner and extended horizontally with respect to the scanner. The electric box includes an electric cabinet having a box shape and an electrical device disposed inside the electric cabinet.

14 Claims, 6 Drawing Sheets

(56) References Cited

U.S. PATENT DOCUMENTS

| | | | |
|---|---|---|---|
| 2004/0096237 A1* | 5/2004 | Asai | G03G 15/5016 399/107 |
| 2007/0041759 A1* | 2/2007 | Chen | G03G 15/2064 399/328 |
| 2007/0070430 A1* | 3/2007 | Nojima | H04N 1/00538 358/296 |
| 2008/0170604 A1 | 7/2008 | Komoda | |
| 2009/0274484 A1* | 11/2009 | Takemoto | G03G 21/16 399/107 |
| 2012/0082478 A1* | 4/2012 | Wang | G03G 21/1633 399/110 |
| 2012/0162728 A1 | 6/2012 | Ota et al. | |
| 2012/0320435 A1* | 12/2012 | Horiuchi | G03G 15/043 358/475 |
| 2014/0192374 A1 | 7/2014 | Shinohara | |
| 2016/0004215 A1* | 1/2016 | Yamashita | B41J 29/377 399/92 |
| 2016/0161904 A1 | 6/2016 | Matsuda et al. | |

OTHER PUBLICATIONS

Communication dated Oct. 24, 2018 by the European Patent Office for EP Application No. 16183847.9.

* cited by examiner

IMAGE FORMING APPARATUS

CROSS-REFERENCE TO RELATED APPLICATION

This patent application is based on and claims priority pursuant to 35 U.S.C. § 119 to Japanese Patent Application No. 2015-169518, filed on Aug. 28, 2015, in the Japanese Patent Office, the entire disclosure of which is hereby incorporated by reference herein.

BACKGROUND

Technical Field

Example embodiments generally relate to an image forming apparatus, and more particularly, to an image forming apparatus for forming an image on a recording medium.

Background Art

Related-art image forming apparatuses, such as copiers, facsimile machines, printers, or multifunction printers having two or more of copying, printing, scanning, facsimile, plotter, and other functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a developing device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such image forming apparatus may include a driver mounted on a rear face of the image forming apparatus and an electric box mounted on the driver and extended vertically. The electric box may increase the depth of the image forming apparatus, increasing the location area where the image forming apparatus is located.

SUMMARY

At least one embodiment provides a novel image forming apparatus that includes a scanner to read an image on an original and an electric box disposed below the scanner and extended horizontally with respect to the scanner. The electric box includes an electric cabinet having a box shape and an electrical device disposed inside the electric cabinet.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

The accompanying drawings are intended to depict example embodiments and should not be interpreted to limit the scope thereof. The accompanying drawings are not to be considered as drawn to scale unless explicitly noted.

DETAILED DESCRIPTION

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a term such as "below" can encompass both an orientation of above and below. The device may be otherwise oriented (rotated 90 degrees or at other orientations) and the spatially relative descriptors used herein are interpreted accordingly.

Although the terms first, second, and the like may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present disclosure.

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Figure 1:
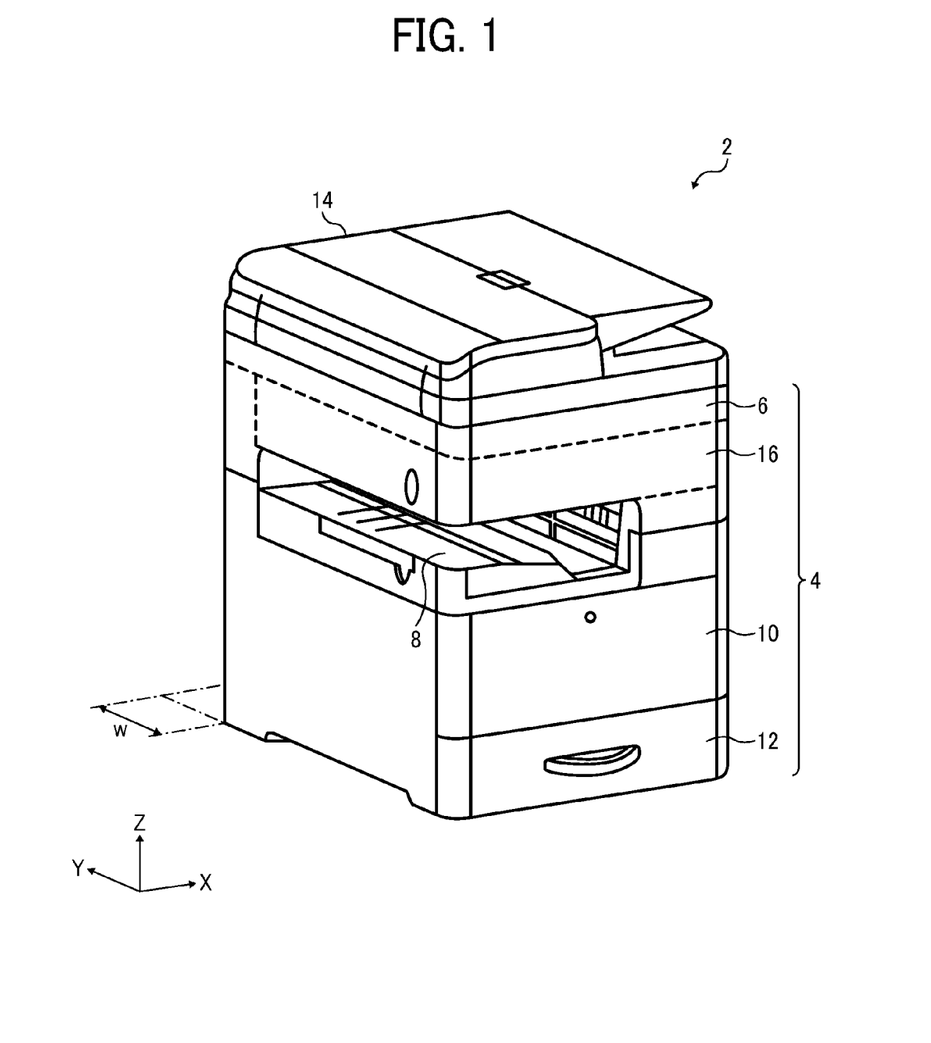
FIG. 1 is an external perspective view of a monochrome image forming apparatus according to an example embodiment of the present disclosure.

Referring now to the drawings, wherein like reference numerals designate identical or corresponding parts throughout the several views, particularly to FIG. 1, an image forming apparatus 2 according to an example embodiment is explained.

FIG. 1 is an external perspective view of the image forming apparatus 2. The image forming apparatus 2 may be a copier, a facsimile machine, a printer, a multifunction peripheral or a multifunction printer (MFP) having at least one of copying, printing, scanning, facsimile, and plotter functions, or the like. According to this example embodiment, the image forming apparatus 2 is a monochrome copier that forms a monochrome toner image on a recording medium by electrophotography. Alternatively, the image forming apparatus 2 may be a color copier that forms a color toner image on a recording medium. Yet alternatively, the image forming apparatus 2 may form an image on a recording medium by inkjet printing.

Referring to FIG. 1, a description is provided of a construction of the image forming apparatus 2.

As illustrated in FIG. 1, the image forming apparatus 2 includes an auto document feeder (ADF) 14 and a body 4. The body 4 includes a scanner 6, an electric box 16, an output tray 8, an image forming device 10, and a paper tray 12. The scanner 6 is disposed in an upper portion of the body 4 and serves as an image reader that reads an image on an original. The output tray 8 is disposed in the upper portion of the body 4 and below the scanner 6. The output tray 8 serves as a sheet output portion or a sheet receiver that receives a sheet bearing a toner image that is ejected from the image forming device 10. Below the output tray 8 are the image forming device 10 and the paper tray 12 detachably attached to the body 4. Above the scanner 6 is the ADF 14 serving as an automatic document feeder that automatically feeds the original to the scanner 6.

Alternatively, the image forming apparatus 2 may also serve as a printer in which the image forming device 10 forms a toner image on a sheet according to image data sent from an external device such as a client computer. Yet alternatively, the image forming apparatus 2 may also serve as a facsimile machine.

Figure 2:
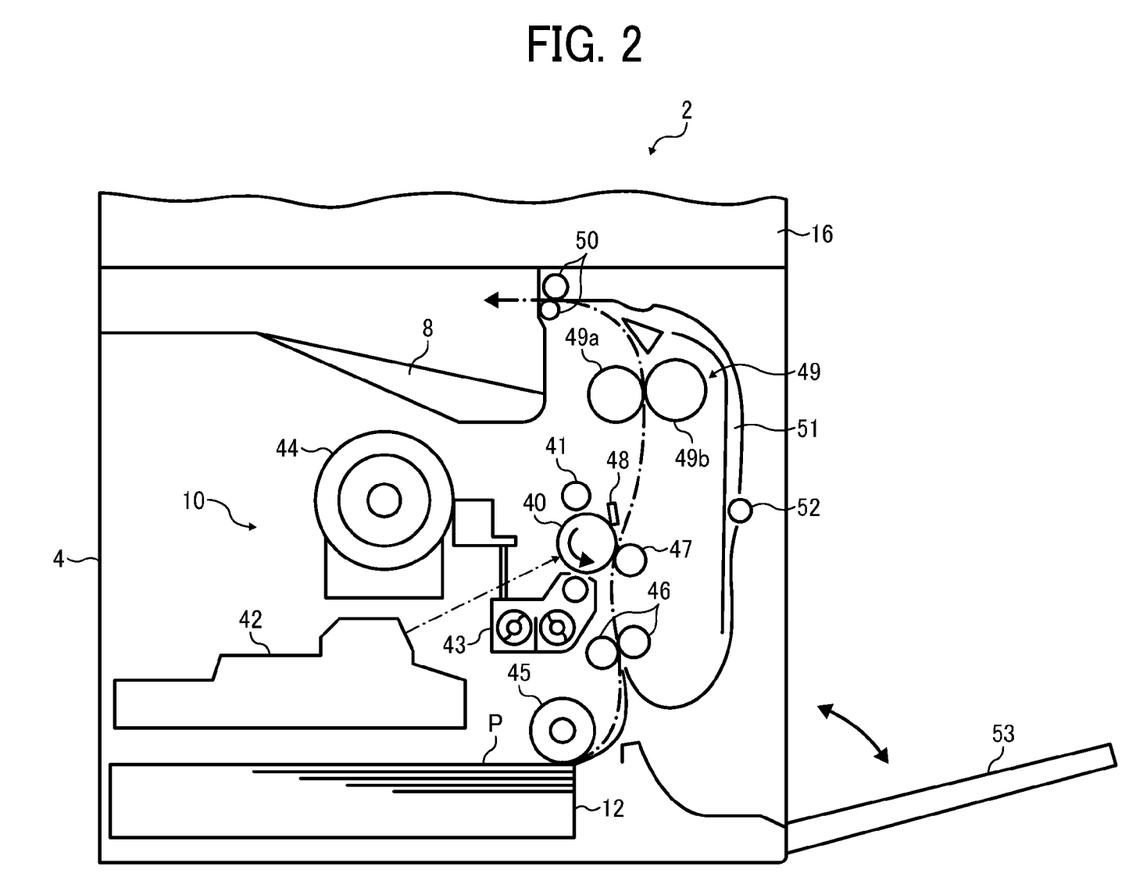
FIG. 2 is a schematic vertical cross-sectional view of the image forming apparatus illustrated in FIG. 1.

Referring to FIG. 2, a description is provided of a construction of the image forming device 10.

FIG. 2 is a schematic vertical cross-sectional view of the image forming apparatus 2. The image forming device 10 includes a photoconductive drum 40 serving as an image bearer. A charger 41 uniformly changes an outer circumferential surface of the photoconductive drum 40. An exposure device 42 forms an electrostatic latent image on the photoconductive drum 40 according to image data. A developing device 43 visualizes the electrostatic latent image as a toner image. A feed roller 45 picks up and feeds a sheet P serving as a recording medium from the paper tray 12 to a registration roller pair 46. The registration roller pair 46 conveys the sheet P to a transfer nip formed between the photoconductive drum 40 and a transfer device 47 at a given time when the toner image formed on the photoconductive drum 40 reaches the transfer nip. The transfer device 47 transfers the toner image formed on the photoconductive drum 40 onto the sheet P.

After the transfer of the toner image from the photoconductive drum 40 onto the sheet P, a cleaner 48 removes residual toner and the like failed to be transferred onto the sheet P and therefore remaining on the outer circumferential surface of the photoconductive drum 40 therefrom. A fixing device 49 including a fixing roller 49a heated by a heater and a pressure roller 49b, for example, fixes the toner image on the sheet P. An output roller pair 50 ejects the sheet P bearing the fixed toner image onto the output tray 8.

If a print job requests duplex printing to form a toner image on both sides of the sheet P, the output roller pair 50 rotates reversely to convey the sheet P to a conveyance path 51 such that a trailing edge of the sheet P having been conveyed from the fixing device 49 to the output roller pair 50 becomes a leading edge of the sheet P conveyed from the output roller pair 50 to the conveyance path 51. A conveyance roller 52 conveys the sheet P to the registration roller pair 46 which conveys the sheet P to the transfer nip at a given time when another toner image formed on the photoconductive drum 40 reaches the transfer nip.

A bypass tray 53, which is opened and closed with respect to the body 4, loads one or more sheets P. A toner bottle 44 serves as a toner supply that supplies fresh toner to the developing device 43.

The image forming apparatus 2 depicted in FIG. 2 is a monochrome image forming apparatus that forms a monochrome toner image on a sheet P. Alternatively, the image forming apparatus 2 may be a color image forming apparatus that forms a color toner image on a sheet P as illustrated in FIG. 3.

A description is provided of a construction of an image forming apparatus 2S serving as a color image forming apparatus.

Figure 3:
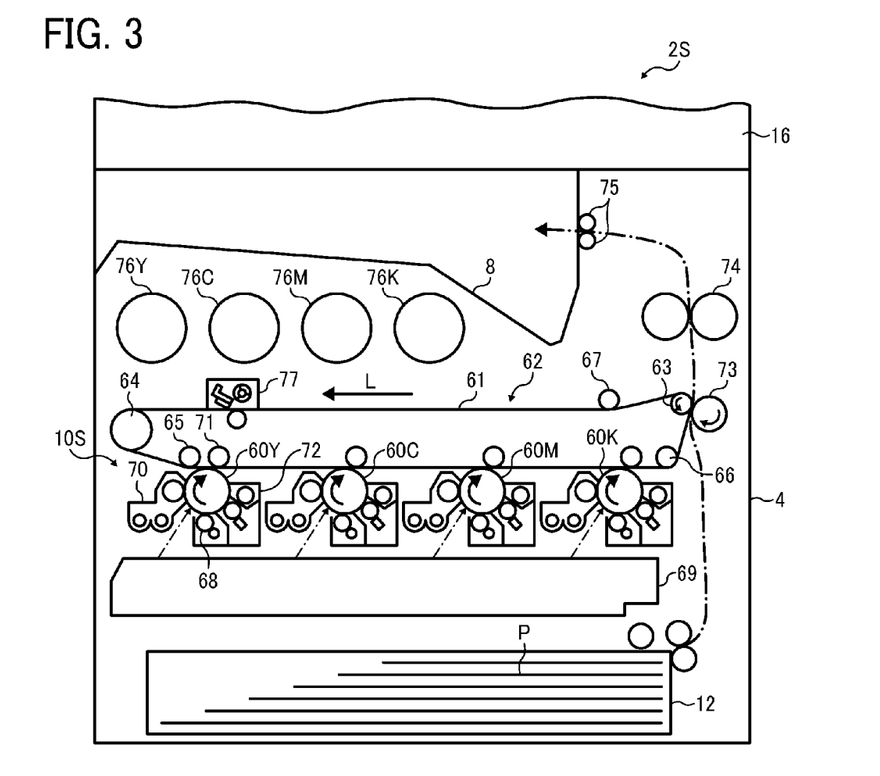
FIG. 3 is a schematic vertical cross-sectional view of a color image forming apparatus according to another example embodiment of the present disclosure.

FIG. 3 is a schematic vertical cross-sectional view of the image forming apparatus 2S. As illustrated in FIG. 3, the image forming apparatus 2S includes a tandem image forming device 10S including four image forming units (e.g., process cartridges) aligned horizontally in FIG. 3. The four image forming units include four photoconductive drums 60Y, 60C, 60M, and 60K serving as image bearers, respectively. Suffixes Y, C, M, and K denote yellow, cyan, magenta, and black, respectively, as colors of a developer used to form a toner image. An intermediate transfer unit 62 is disposed opposite the photoconductive drums 60Y, 60C, 60M, and 60K of the image forming units, respectively. The intermediate transfer unit 62 includes an intermediate transfer belt 61 (e.g., an endless belt) serving as an intermediate transferor. The intermediate transfer belt 61 is rotatably looped over a plurality of support rollers 63, 64, 65, and 66.

As the support roller 63 serving as a driving roller is driven and rotated counterclockwise in FIG. 3, the intermediate transfer belt 61 is driven and rotated in a rotation direction L. A tension roller 67 presses against an outer circumferential surface of the intermediate transfer belt 61 to exert tension to the intermediate transfer belt 61. The photoconductive drums 60Y, 60C, 60M, and 60K are driven and rotated clockwise in FIG. 3 while the photoconductive drums 60Y, 60C, 60M, and 60K contact the outer circumferential surface of the intermediate transfer belt 61. A charging roller 68 charges the outer circumferential surface of the first photoconductive drum 60Y disposed upstream from the photoconductive drums 60C, 60M, and 60K in the rotation direction L of the intermediate transfer belt 61 at a given polarity. An optical writing unit 69 serving as an exposure device emits an optically modulated laser beam onto the charged outer circumferential surface of the photoconductive drum 60Y. Thus, an electrostatic latent image is formed on the first photoconductive drum 60Y. A developing device 70 visualizes the electrostatic latent image as a yellow toner image. As a primary transfer roller 71 is applied with a transfer voltage, the primary transfer roller 71 primarily transfers the yellow toner image formed on the photoconductive drum 60Y onto the outer circumferential surface of the intermediate transfer belt 61 driven and rotated in the rotation direction L. After the primary transfer of the yellow toner image from the photoconductive drum 60Y onto the intermediate transfer belt 61, a cleaner 72 removes residual toner failed to be transferred onto the intermediate transfer belt 61 and therefore remaining on the outer circumferential surface of the photoconductive drum 60Y therefrom.

Similarly, cyan, magenta, and black toner images are formed on the second photoconductive drum 60C, the third photoconductive drum 60M, and the fourth photoconductive drum 60K, respectively, and primarily transferred onto the intermediate transfer belt 61 successively such that the cyan, magenta, and black toner images are superimposed on the yellow toner image on the intermediate transfer belt 61. Thus, the yellow, cyan, magenta, and black toner images superimposed on the intermediate transfer belt 61 constitute a color toner image. The paper tray 12 serving as a sheet feeder is disposed in a lower portion of the body 4. As a registration roller pair rotates, the registration roller pair conveys a sheet P sent from the paper tray 12 to a secondary transfer nip formed between the intermediate transfer belt 61 and a secondary transfer roller 73 at a given time when the color toner image formed on the intermediate transfer belt 61 reaches the secondary transfer nip. The secondary transfer nip is formed between a portion of the intermediate transfer belt 61 that is supported by the support roller 63 and the secondary transfer roller 73 disposed opposite the support roller 63. As the secondary transfer roller 73 is applied with a transfer voltage, the secondary transfer roller 73 secondarily transfers the yellow, cyan, magenta, and black toner images constituting the color toner image and superimposed on the intermediate transfer belt 61 onto the sheet P collectively. The secondary transfer roller 73 is pressed against the support roller 63 via the intermediate transfer belt 61. The secondary transfer roller 73 is driven and rotated clockwise in FIG. 3 while the secondary transfer roller 73 contacts the outer circumferential surface of the intermediate transfer belt 61.

The sheet P bearing the color toner image is conveyed to a fixing device 74 that fixes the color toner image on the sheet P under heat and pressure. An output roller pair 75 ejects the sheet P conveyed from the fixing device 74 onto the output tray 8 that stacks the sheet P. Toner bottles 76Y, 76C, 76M, and 76K supply fresh yellow, cyan, magenta, and black toners to the developing devices 70, respectively. After the secondary transfer, residual toner failed to be transferred onto the sheet P remains on the intermediate transfer belt 61. The intermediate transfer unit 62 further includes a belt cleaner 77 that removes the residual toner from the intermediate transfer belt 61.

FIG. 3 illustrates the image forming apparatus 2S employing a tandem intermediate transfer method. Alternatively, the image forming apparatus 2S may employ a tandem direct transfer method or a construction in which a plurality of developing devices surrounds a single photoconductive drum.

A description is provided of a construction of a first comparative image forming apparatus.

The first comparative image forming apparatus is requested to be downsized to reduce a location area where the first comparative image forming apparatus is located. For example, the first comparative image forming apparatus used as a desktop machine is requested to reduce the location area more than the first comparative image forming apparatus used as a medium print speed machine or a high print speed machine located on a floor. The first comparative image forming apparatus includes a driver and an electric box. The driver is mounted on a rear face of the first comparative image forming apparatus that is opposite a front face of the first comparative image forming apparatus that serves as an operation face facing a user who uses the first comparative image forming apparatus. The electric box extends vertically. A length of the electric box may be decreased in a depth direction of the first comparative image forming apparatus to reduce the location area where the first comparative image forming apparatus is located. The location area defines a projection area projected in a height direction of the first comparative image forming apparatus. However, since the electric box is needed to drive the first comparative image forming apparatus, downsizing of the first comparative image forming apparatus is restricted.

A first example of the first comparative image forming apparatus includes an image forming device, a scanner, a support, and an output tray. The scanner serving as an image reader is disposed above the image forming device. The output tray is interposed between the scanner and the image forming device. The support disposed below the scanner accommodates a part of electrical devices of the scanner, utilizing a region occupied by the support that supports the scanner.

A second example of the first comparative image forming apparatus includes a plurality of electrical devices, for example, a central processing unit (CPU) board and a power supply board that are interposed between the image forming device and the output tray. Since the output tray is tilted, the CPU board and the power supply board are situated in a restricted space disposed on an upstream portion of the output tray in a sheet ejection direction.

Thus, a part of the electrical devices is situated in a space defined between the image forming device and the output tray. Accordingly, the length of the electric box mounted on the rear face of the first comparative image forming apparatus and extended vertically is shortened, reducing the location area where the first comparative image forming apparatus is located. However, since a part of the electrical devices is accommodated in the redundant space, the location area of the first comparative image forming apparatus may not be reduced sufficiently.

A description is provided of a construction of a second comparative image forming apparatus incorporating a comparative electric box.

The comparative electric box accommodates a plurality of substrates that controls various electric or electronic parts, such as a motor, a solenoid, and a sensor, situated inside the second comparative image forming apparatus. The plurality of substrates is secured to the comparative electric box with screws and the like. A driving unit incorporates a motor and a gear box that control and drive rollers and belts that constitute a layout of parts used to convey a sheet and form a toner image. The driving unit is mounted on a rear face of a body of the second comparative image forming apparatus. The comparative electric box is mounted on a rear face of the driving unit.

Figure 4:
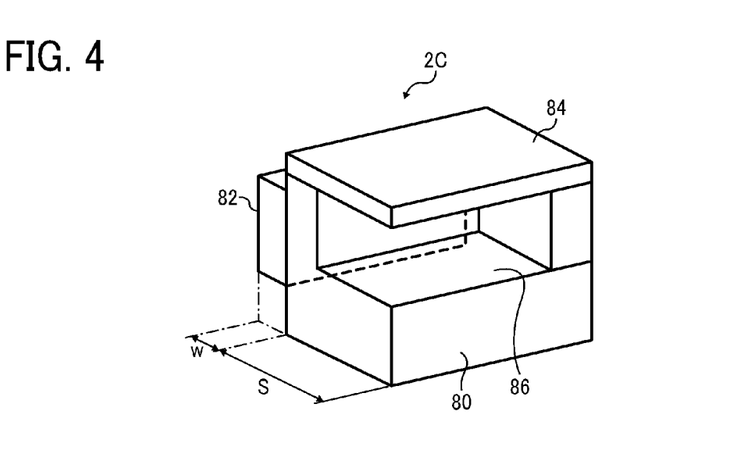
FIG. 4 is a perspective view of a comparative image forming apparatus.

FIG. 4 is a perspective view of a second comparative image forming apparatus 2C. As illustrated in FIG. 4, the second comparative image forming apparatus 2C includes a comparative electric box 82 mounted on a rear face of the second comparative image forming apparatus 2C that is opposite a front cover 80 serving as an operation face facing the user who uses the second comparative image forming apparatus 2C. The comparative electric box 82 extends vertically. Thus, the comparative electric box 82 facilitates assembly and maintenance. The second comparative image forming apparatus 2C further includes a scanner 84 and an output tray 86. The second comparative image forming apparatus 2C has a length S in a depth direction of the second comparative image forming apparatus 2C. The driving unit and the comparative electric box 82 mounted on the rear face of the driving unit increase a depth of the second comparative image forming apparatus 2C, thus increasing a location area where the second comparative image forming apparatus 2C is located. A length w of the comparative electric box 82 may be decreased in the depth direction of the second comparative image forming apparatus 2C to reduce the location area where the second comparative image forming apparatus 2C is located. However, since the comparative electric box 82 is needed to drive the second comparative image forming apparatus 2C, downsizing of the second comparative image forming apparatus 2C is restricted.

Referring back to FIG. 1, a description is provided of a construction of the image forming apparatus 2 according to an example embodiment.

As illustrated in FIG. 1, a width direction X, a depth direction Y, and a height direction Z of the image forming apparatus 2 define directions seen from the user facing a front face serving as an operation face of the image forming apparatus 2, respectively. The electric box 16 is disposed above the output tray 8 and below the scanner 6. The electric box 16 extends substantially horizontally (e.g., horizontally). Since the electric box 16 is disposed inside an electric box container, the electric box 16 is not visible from an outside of the electric box container.

As illustrated in FIG. 1, the electric box 16 is disposed below the scanner 6 and extended horizontally unlike the comparative electric box 82 mounted on the rear face of the second comparative image forming apparatus 2C as illustrated in FIG. 4. Accordingly, the electric box 16 eliminates the length w in the depth direction Y depicted in FIG. 1 that is equivalent to the length w of the comparative electric box 82 in the depth direction of the second comparative image forming apparatus 2C depicted in FIG. 4. Consequently, the electric box 16 reduces a location area where the image forming apparatus 2 is located substantially.

Like the first example of the first comparative image forming apparatus described above, the whole electric box 16 accommodating a plurality of electrical devices collectively, not a part of the electrical devices, is within a projection area projected in the height direction Z, thus reducing the location area where the image forming apparatus 2 is located substantially.

Compared to the comparative electric box 82 depicted in FIG. 4, the electric box 16 depicted in FIG. 1 increases a height of the image forming apparatus 2 by a height of the electric box 16 in the height direction Z. However, since the electric box 16 extends horizontally, the height of the electric box 16 barely degrades the external appearance and operation of the image forming apparatus 2. Since the rear face of the second comparative image forming apparatus 2C depicted in FIG. 4 mounts the comparative electric box 82, the center of gravity of the second comparative image forming apparatus 2C is biased. Conversely, the electric box 16 depicted in FIG. 1 extends horizontally, preventing the center of gravity of the image forming apparatus 2 from being biased.

Figure 5:
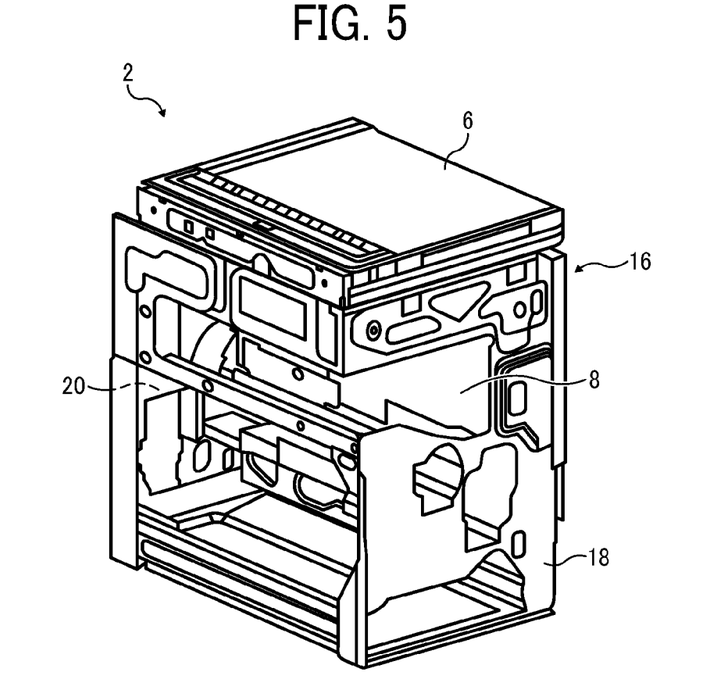
FIG. 5 is a perspective view of a frame of the image forming apparatus depicted in FIG. 1.

FIG. 5 is a perspective view of a frame of the image forming apparatus 2, eliminating components disposed inside the image forming apparatus 2. As illustrated in FIG. 5, the image forming apparatus 2 further includes a front plate 18 and a rear plate 20 opposite the front plate 18. The user faces the front plate 18 while the user operates the image forming apparatus 2.

Figure 6:
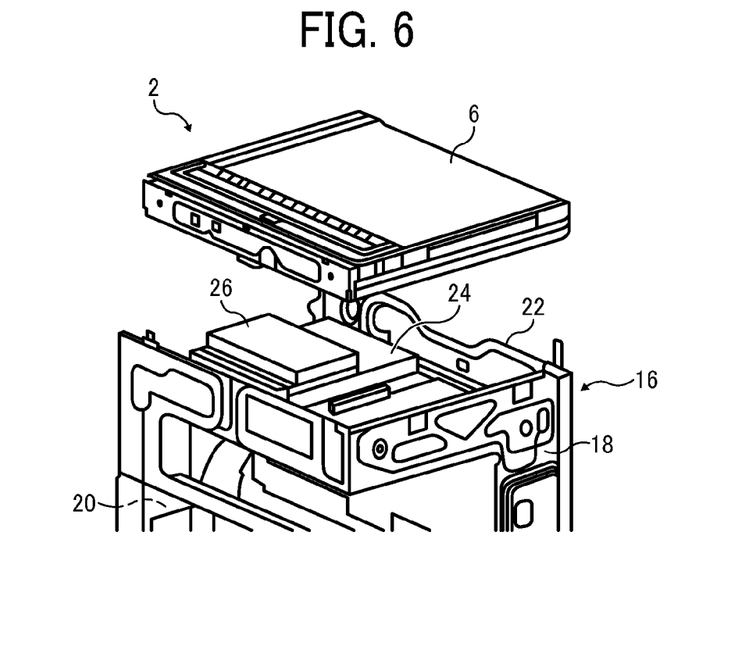
FIG. 6 is a partial perspective view of the frame of the image forming apparatus depicted in FIG. 5.

FIG. 6 is a partial perspective view of the frame of the image forming apparatus 2. As illustrated in FIG. 6, the electric box 16 includes an electric cabinet 22 having a box shape and a plurality of electrical devices disposed inside the electric cabinet 22. The plurality of electrical devices includes a controller board (CTL) 24 and an image forming device control board (BiCU) 26. The CTL 24 includes a controller board that drives the scanner 6 and the image forming apparatus 2. The electric cabinet 22 is made of a material (e.g., a sheet metal) that blocks an electric wave generated by the controller board and the like to shield an outside of the electric box 16 from the electric wave. Thus, the electric cabinet 22 prevents the electric wave from adversely affecting the scanner 6 and the like. The electric cabinet 22 bridges or spans the front plate 18 and the rear plate 20 and is coupled to the front plate 18 and the rear plate 20. Accordingly, the electric box 16 is coupled to the frame, enhancing the rigidity of the frame.

Figure 7A:
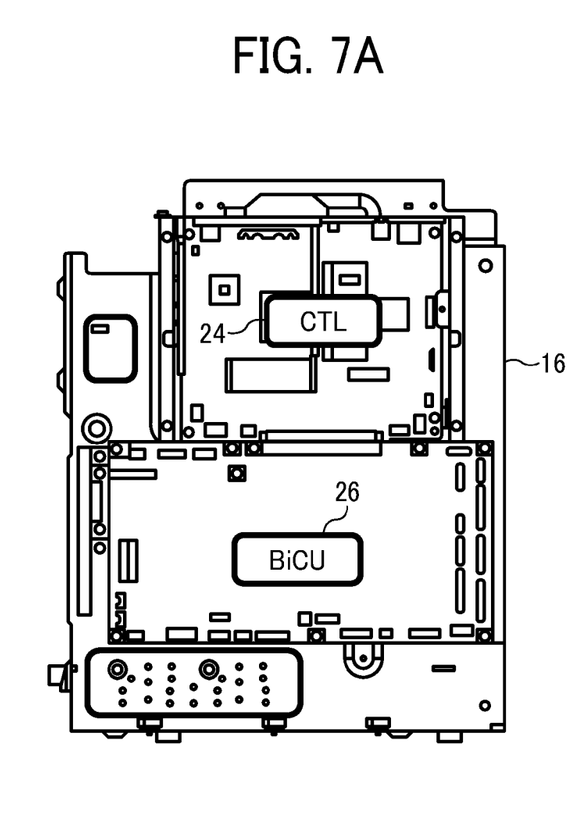
FIG. 7A is a plan view of an electric box incorporated in the image forming apparatus depicted in FIG. 1, illustrating a basic substrate layout of the electric box.

FIG. 7A is a plan view of the electric box 16, illustrating a basic substrate layout of a plurality of substrates, that is, a plurality of electrical devices. The basic substrate layout without an optional electrical device includes at least the CTL 24 (e.g., the controller board) and the BiCU 26 (e.g., the image forming device control board). Since the CTL 24 and the BiCU 26 generate an electric wave when the image forming apparatus 2 is in operation, the CTL 24 and the BiCU 26 are placed inside the box made of the sheet metal. Alternatively, the CTL 24 and the BiCU 26 may be coupled to one or more optional substrates.

Figure 7B:
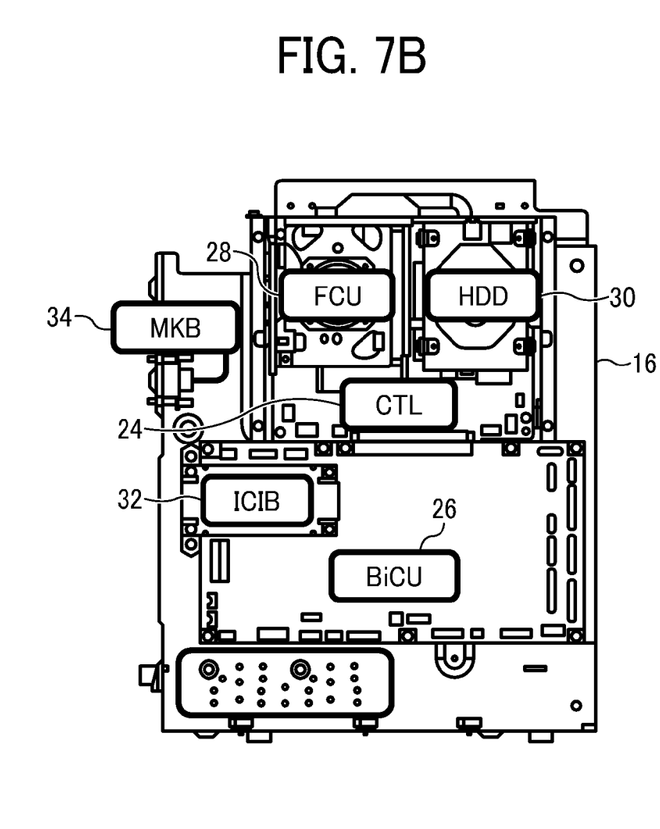
FIG. 7B is a plan view of the electric box depicted in FIG. 7A, illustrating an optional substrate layout of the electric box.

FIG. 7B is a plan view of the electric box 16, illustrating an optional substrate layout incorporating a plurality of optional substrates. As illustrated in FIG. 7B, the CTL 24 is coupled to a facsimile board (FCU) 28 and a hard disc drive (HDD) 30 as needed. The BiCU 26 is coupled to an illegal copy guard board (ICIB) 32 and a billing interface board (MKB) 34 as needed.

The substrate installed in the electric box 16, such as the CTL 24 and the BiCU 26, includes an element, such as a semiconductor, and is heat sensitive. As illustrated in FIG. 1, according to this example embodiment, the electric box 16 is disposed above the output tray 8 serving as a thermal insulation space that protects the electric box 16 from heat generated by the fixing device 49 depicted in FIG. 2 that is heated most within the image forming device 10. The electric box 16 is disposed above and spaced apart from the image forming device 10 through the output tray 8 serving as a thermal insulation space interposed between the image forming device 10 and the electric box 16. Hence, the output tray 8 suppresses conduction of heat from the image forming device 10 to the electric box 16. On the other hand, since the electric box 16 is partially coupled to the image forming device 10, heat generated by the image forming device 10 may be conducted to a part of the electric box 16 through a joint interposed between the image forming device 10 and the electric box 16. To address this circumstance, the image forming apparatus 2 has a configuration described below.

Figure 8:
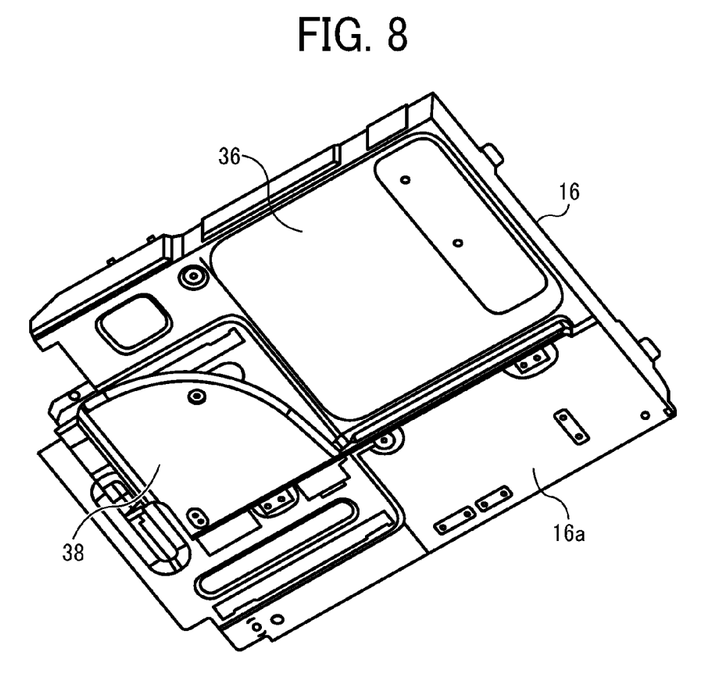
FIG. 8 is a perspective bottom view of the electric box depicted in FIG. 7A.

FIG. 8 is a perspective bottom view of the electric box 16. The electric box 16 disposed above the output tray 8 may receive heat from the fixing device 49 and the sheet ejected onto the output tray 8. To address this circumstance, according to this example embodiment, an insulator is mounted on a bottom of the electric box 16 that is disposed opposite the output tray 8. The insulator insulates the electric box 16 from heat conducted from the fixing device 49 and the sheet ejected onto the output tray 8. For example, an insulation sheet 36 serving as an insulator is attached to a bottom face 16*a* of the electric box 16.

The bottom face 16*a* of the electric box 16 further mounts a heat exhaust duct 38 which exhausts heat conducted from the image forming device 10 thereto toward an outside of the image forming apparatus 2. The heat exhaust duct 38 which exhausts heat conducted from the image forming device 10 thereto toward the outside of the image forming apparatus 2 also insulates the electric box 16 from heat conducted from the sheet ejected onto the output tray 8 like the insulation sheet 36.

As illustrated in FIG. 6, the scanner 6 is detachably attached to the electric box 16. If the substrate installed in the electric box 16 suffers from failure, the substrate is removed for repair or replacement. A service engineer accesses an interior of the electric box 16 to install an optional substrate. To address those circumstances, the scanner 6 is detachable from the image forming apparatus 2 to allow the service engineer to access the electric box 16 readily.

Figure 9:
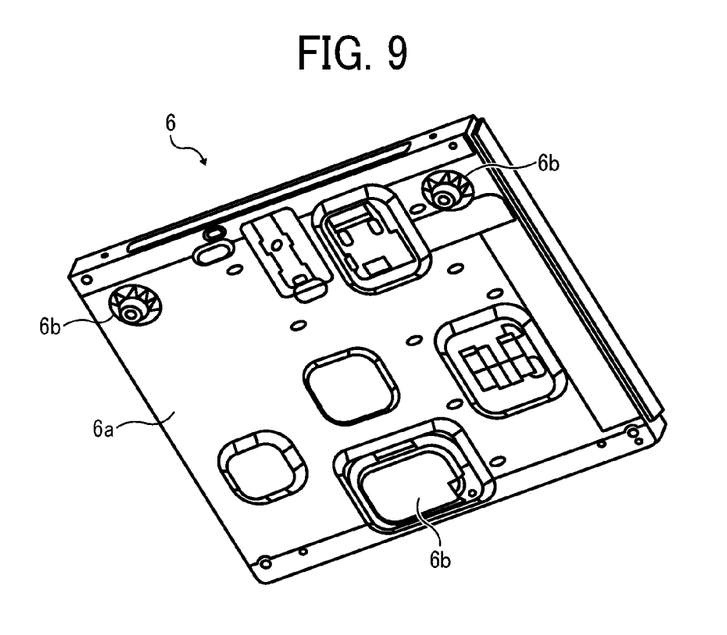
FIG. 9 is a perspective bottom view of a scanner incorporated in the image forming apparatus depicted in FIG. 1.

FIG. 9 is a perspective bottom view of the scanner 6. As illustrated in FIG. 9, a bottom face 6*a* of the scanner 6 mounts a plurality of legs 6*b* projecting toward the electric box 16. The service engineer may remove the scanner 6 from the image forming apparatus 2 to perform maintenance on the substrate placed inside the electric box 16. In this case, the legs 6*b* allow the service engineer to temporarily place the scanner 6 on a mount (e.g., a table) safely and stably. As the legs 6*b* contact the mount, the scanner 6 is placed on the mount stably, preventing the scanner 6 from being damaged or broken. For example, each of the legs 6*b* includes an elastic member made of rubber or the like or a mold member. FIG. 9 illustrates one leg 6*b* made of the mold member and two legs 6*b* made of rubber as one example.

Instead of the legs 6*b* made of rubber, a sheet metal constituting the bottom face 6*a* of the scanner 6 may be treated with drawing process to produce the legs 6*b* molded with the bottom face 6*a*. Similarly, if a body of the scanner 6 is made of a mold member, like the bottom face 6*a* made of the sheet metal, the legs 6*b* may be molded with the bottom face 6*a*. When the scanner 6 is placed on a top face of the electric box 16, the legs 6*b* mounted on the scanner 6 are accommodated inside the electric box 16, that is, inside the electric cabinet 22. Thus, the legs 6*b* do not hinder the bottom face 6*a* of the scanner 6 from contacting the electric box 16. In other words, an interior space of the electric cabinet 22 is used as an accommodating space that accommodates the legs 6*b* of the scanner 6. Thus, the legs 6*b* are mounted on the bottom face 6*a* of the scanner 6 without a space allocated for the legs 6*b* projecting toward the electric box 16.

A description is provided of advantages of the image forming apparatuses 2 and 2S.

As illustrated in FIGS. 1 and 3, an image forming apparatus (e.g., the image forming apparatuses 2 and 2S) includes a body (e.g., the body 4) that accommodates a scanner (e.g., the scanner 6), a sheet receiver (e.g., the output tray 8), and an electric box (e.g., the electric box 16). The scanner is disposed in an upper portion of the body. The sheet receiver is disposed below the scanner. The electric box is disposed above the sheet receiver and below the scanner and extended horizontally with respect to the scanner. As illustrated in FIG. 6, the electric box includes an electric cabinet (e.g., the electric cabinet 22) having a box shape and an electrical device (e.g., the CTL 24 and the BiCU 26) disposed inside the electric cabinet.

Accordingly, the image forming apparatus reduces a location area where the image forming apparatus is located sufficiently.

The present disclosure is not limited to the details of the example embodiments described above and various modifications and improvements are possible. The advantages achieved by the example embodiments described above are examples and therefore are not limited to those described above.

The present disclosure has been described above with reference to specific example embodiments. Note that the present disclosure is not limited to the details of the embodiments described above, but various modifications and enhancements are possible without departing from the spirit and scope of the disclosure. It is therefore to be understood that the present disclosure may be practiced otherwise than as specifically described herein. For example, elements and/or features of different illustrative example embodiments may be combined with each other and/or substituted for each other within the scope of the present disclosure.

What is claimed is:

1. An image forming apparatus comprising:
a scanner configured to read an image on an original;
a body including,
an image forming device between a front plate and a rear plate, the image forming device configured to form an image on a sheet, and
a sheet receiver onto which the sheet bearing the image formed by the image forming device is ejected, the sheet receiver being in an internal space within the image forming apparatus above the image forming device and below the scanner;
an electric box coupled to the rear plate below the scanner and above the sheet receiver and extended horizontally with respect to the scanner such that a bottom face of the electric box facing the image forming device is separated from the image forming device by the internal space formed by the sheet receiver, the electric box including an electrical device inside the electric box; and
an insulator on the bottom face of the electric box, the insulator configured to thermally insulate the electric box from heat.

2. The image forming apparatus according to claim 1, wherein the electrical device includes a controller board configured to generate an electric wave to drive the scanner and the image forming apparatus, and
wherein the electric box is made of a sheet metal.

3. The image forming apparatus according to claim 2, wherein the electrical device further includes an image forming device control board to drive the image forming device.

4. The image forming apparatus according to claim 1, wherein,
the front plate is configured to face a user who uses the image forming apparatus,
the rear plate is opposite the front plate,
the electric box bridges the front plate and the rear plate and is coupled to the front plate and the rear plate.

5. The image forming apparatus according to claim 1, wherein the insulator is an insulation sheet.

6. The image forming apparatus according to claim 1, further comprising:
a heat exhaust duct, mounted on the bottom face of the electric box, the heat exhaust duct configured to exhaust the heat toward an outside of the image forming apparatus.

7. The image forming apparatus according to claim 1, wherein the scanner is detachably attached to the electric box.

8. The image forming apparatus according to claim 7, wherein the scanner includes:
a bottom face; and
a leg mounted on the bottom face and projecting from the bottom face toward the electric box.

9. The image forming apparatus according to claim 8, wherein the leg is made of rubber.

10. The image forming apparatus according to claim 8, wherein the leg is molded with the bottom face of the scanner.

11. The image forming apparatus according to claim 10, wherein the bottom face of the scanner is made of a sheet metal.

12. The image forming apparatus according to claim 8, wherein when the scanner is placed on the electric box, the leg of the scanner is accommodated inside the electric box.

13. An electronic box connected to an image forming apparatus, the image forming apparatus including a body and a scanner, the body including an image forming device and a sheet receiver, the image forming device being between a front plate and a rear plate and configured to form an image on a sheet, and the sheet receiver being in an internal space within the image forming apparatus above the image forming device and configured to receive the sheet bearing the image thereon from the image forming device, the electronic box comprising:
an electric cabinet coupled to the rear plate below the scanner and above the sheet receiver and extending horizontally with respect to the scanner such that a bottom face of the electronic box facing the image forming device is separated from the image forming device by the internal space formed by the sheet receiver;
an insulator on the bottom face of the electronic box the insulator configured to thermally insulate the electronic box from heat; and
an electrical device inside the electric cabinet, the electrical device configured to control the image forming device.

14. The electronic box of claim 13, further comprising:
a heat exhaust duct, mounted on the bottom face of the electronic box, the heat exhaust duct configured to exhaust the heat toward an outside of the image forming apparatus.

* * * * *